US012623498B2

(12) United States Patent
Brown

(10) Patent No.: US 12,623,498 B2
(45) Date of Patent: *May 12, 2026

(54) DUNNAGE SECUREMENT MEMBERS FOR VEHICLES

(71) Applicant: Timothy F. Brown, Runaway Bay, TX (US)

(72) Inventor: Timothy F. Brown, Runaway Bay, TX (US)

(73) Assignee: Port-O-Call Product Innovations, LLC, Runaway Bay, TX (US)

( * ) Notice: Subject to any disclaimer, the term of this patent is extended or adjusted under 35 U.S.C. 154(b) by 34 days.

This patent is subject to a terminal disclaimer.

(21) Appl. No.: 18/762,794

(22) Filed: Jul. 3, 2024

(65) Prior Publication Data

US 2024/0351384 A1 Oct. 24, 2024

Related U.S. Application Data

(63) Continuation of application No. 17/171,694, filed on Feb. 9, 2021, now Pat. No. 12,054,020.

(51) Int. Cl.
B60D 1/28 (2006.01)
(52) U.S. Cl.
CPC ...................................... B60D 1/28 (2013.01)
(58) Field of Classification Search
CPC ...................................... B60P 7/12; B60D 1/28
USPC ................................................ 410/143, 155
See application file for complete search history.

(56) References Cited

U.S. PATENT DOCUMENTS

| | | | |
|---|---|---|---|
| 2,204,075 | A | 6/1940 | Eisensmith |
| 2,414,160 | A | 1/1947 | Moon |
| 2,697,631 | A | 12/1954 | Miller |
| 2,912,939 | A | 11/1959 | Miner, Jr. et al. |
| 3,154,026 | A | 10/1964 | Klasing, Jr. |
| 3,378,889 | A | 4/1968 | Denderdale |
| 3,669,486 | A | 6/1972 | Pasic |
| 4,413,761 | A | 11/1983 | Angel |
| 4,616,757 | A | 10/1986 | Hobson |
| 5,219,251 | A | 6/1993 | Kanczuzewski |
| 5,226,764 | A | 7/1993 | Meriwether et al. |
| 5,584,623 | A | 12/1996 | Nadherny |
| 7,431,547 | B2 | 10/2008 | Geary et al. |
| 7,677,849 | B2 | 3/2010 | Scott |
| 7,713,008 | B2 | 5/2010 | Kanczuzewski et al. |
| 8,113,753 | B1 | 2/2012 | Grigg et al. |
| 2004/0156692 | A1 | 8/2004 | Rhodes |
| 2010/0111636 | A1 | 5/2010 | Widynowski et al. |
| 2012/0121358 | A1 | 5/2012 | Kanczuzewski et al. |
| 2012/0308325 | A1 | 12/2012 | Pennisi |
| 2022/0250425 | A1 | 8/2022 | Brown |

FOREIGN PATENT DOCUMENTS

WO 2016149754 A1 9/2016

*Primary Examiner* — Hilary L Gutman
(74) *Attorney, Agent, or Firm* — Offit Kurman; Tod A. Kupstas

(57) ABSTRACT

A dunnage securement member is adapted to be placed on the ends of timber that is used as dunnage for trucking. The dunnage securement member is adapted to be secured to the timber, either permanently or removably. A strap may then be used to secure dunnage on the beds of a truck.

18 Claims, 4 Drawing Sheets

DUNNAGE SECUREMENT MEMBERS FOR VEHICLES

CROSS-REFERENCE TO RELATED APPLICATIONS

This application is a continuation of U.S. patent application Ser. No. 17/171,694 filed Feb. 9, 2021, the contents of which are incorporated herein by reference.

TECHNICAL FIELD

Disclosed embodiments are generally related to securing dunnage in vehicles. In particular, the disclosure is related to an apparatus for retaining types of dunnage.

DESCRIPTION OF THE RELATED ART

When transporting items in the trucking industry various types of loads are encountered. Some of loads can be very heavy, cumbersome, or unwieldly, such as concrete blocks, oil field equipment, mud motors, pipes, culverts, etc. Prior to placing heavy loads onto a truck that can damage the flooring of trailers and/or having a load that needs to be elevated so as to be able to have fork lifts or other equipment be able to get under and lift the load, usually several timbers are placed across the flat bed surface and under these loads.

The timbers generally used are 4×4 boards, 4×6 boards, and/or landscape timbers. The timbers have a tendency to shift or move around during transport. The shifted timbers can be hazardous as they may stick out past the sides of the trailer. This can lead to the timbers striking other vehicles or falling onto the road off and into oncoming traffic. Further, they can lay in the road where they get run over and broken up causing damage to other vehicles and/or potentially harming unsuspecting motorists.

Therefore, there is a need in the field to provide a way to improve the safety of using dunnage, such as timbers.

SUMMARY

Briefly described, aspects of the present disclosure relate to securing dunnage.

An aspect of the present disclosure may be a dunnage securement member. The dunnage securement member comprising: a body having a substantially rectangular shaped cavity adapted to receive timber; slots formed on at least two sides of the body, each of the slots adapted to receive a bolt for securing the timber; a rounded end adapted to receive thereon a strap for securing timber; and at least two pins adapted to secure the strap to the rounded end.

Another aspect of the present disclosure may be a dunnage securement member. The dunnage securement member comprising: a body having a cavity adapted to receive timber; slots formed on the body, each of the slots adapted to enable securing the timber; an end adapted to receive thereon a strap for securing timber; and at least two pins adapted to secure the strap to the end.

DETAILED DESCRIPTION OF ILLUSTRATIVE EMBODIMENTS

Figure 1:
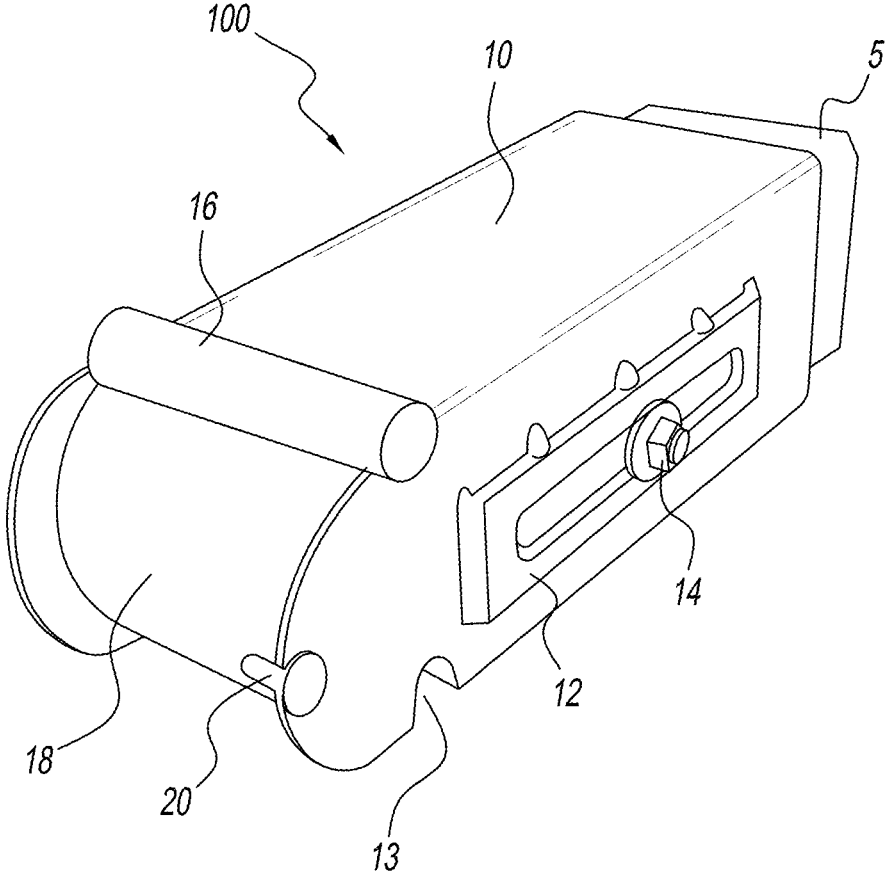
FIG. 1 shows a view of the dunnage securement member.
Figure 2:
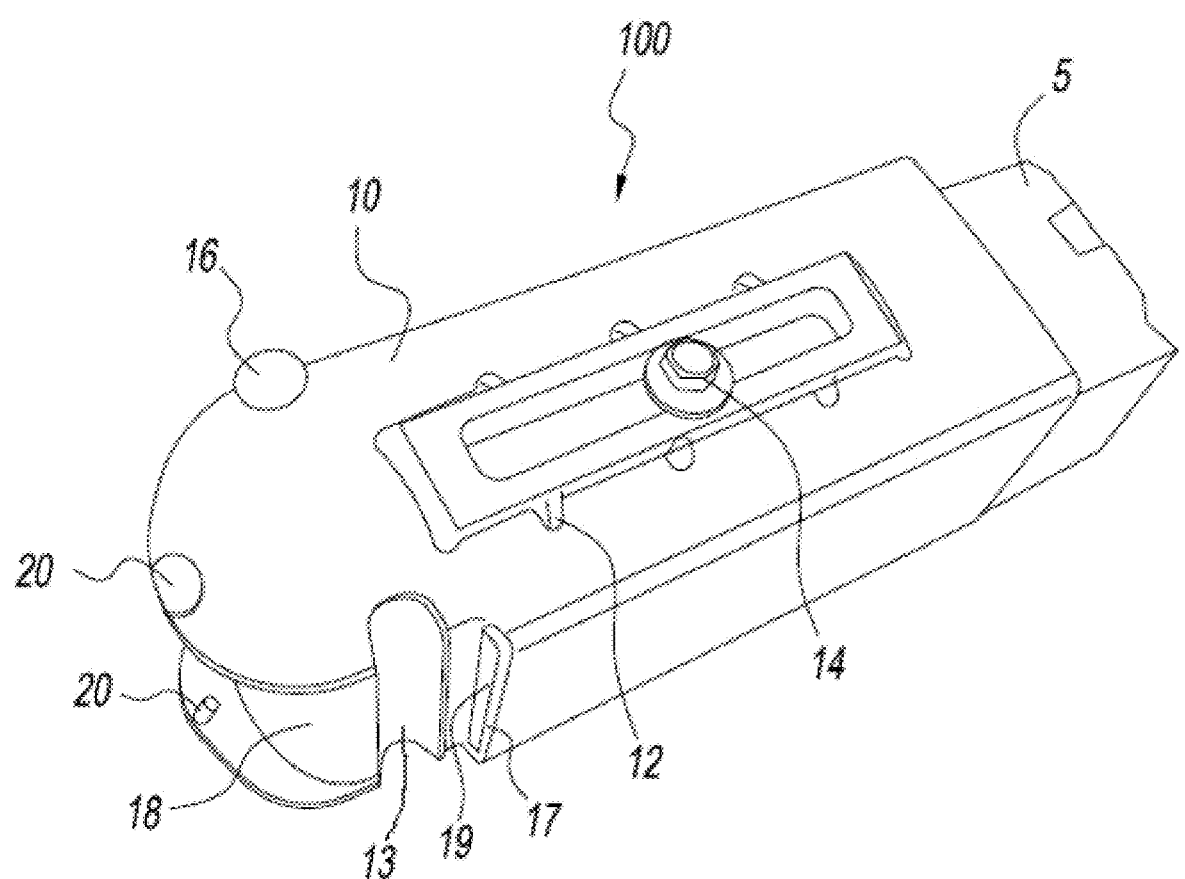
FIG. 2 shows another view of the dunnage securement member.

To facilitate an understanding of embodiments, principles, and features of the present disclosure, they are disclosed hereinafter with reference to implementation in illustrative embodiments. Embodiments of the present disclosure, however, are not limited to use in the described systems or methods and may be utilized in other systems and methods as will be understood by those skilled in the art.

The components described hereinafter as making up the various embodiments are intended to be illustrative and not restrictive. Many suitable components that would perform the same or a similar function as the components described herein are intended to be embraced within the scope of embodiments of the present disclosure.

FIGS. 1-4 show an embodiment of dunnage securement member 100. The dunnage securement member 100 discussed below may be incorporated in various embodiments that are further discussed below and that would further be understood by those of ordinary skill in the art upon reading this disclosure.

An embodiment of the disclosure is a dunnage securement member 100 that is adapted to be affixed to the ends of timber 5. In an embodiment the dunnage securement member 100 is adapted to be affixed to the ends of 4-inch by 4-inch timbers 5. In an embodiment the dunnage securement member 100 is adapted to be affixed to the ends of 4-inch by 6-inch timbers. In an embodiment the dunnage securement member 100 is adapted to be affixed to the ends of landscape timbers. In an embodiment the dunnage securement member 100 is adapted to be affixed to the ends of any one of 4-inch by 4-inch timbers, 4-inch by 6-inch timbers, and land scape timbers. In an embodiment, the dunnage securement member 100 is adapted to be fixed to and adjustable, so as to be fixed to, various types of timbers or similar objects.

In an embodiment, the dunnage securement members are adapted to be permanently secured to the ends of each timber. In an embodiment, the dunnage securement members are adapted to be removably secured to the ends of each timber.

The dunnage securement member 100 has body 10. In an embodiment, the body 10 is made from metal. In an embodiment, the body 10 is made from wood. In an embodiment, the body 10 is made from plastic. In an embodiment, the body 10 is made from a ceramic composite. In an embodiment, the body 10 is made from a combination of the materials discussed above.

The body 10 is formed as a rectangular shaped object that has a cavity formed therein for the receipt of the timber 5. Formed on two sides of the body 10 are rectangular-shaped slots 12. In an embodiment, the slots 12 are formed as circles. In an embodiment, the slots 12 are formed as squares. In an embodiment, the slots 12 are formed as triangles. In an embodiment, the slots 12 are formed as polygonal shape. In an embodiment, the slots 12 are located on more than two sides of the body 10.

The slots 12 are adapted to receive bolts 14. The bolts 14 are used to secure the body to the timber 5 through the tightening of the bolts 14. In an embodiment, nails are used to secure the timber. In an embodiment, screws are used to secure the timber. In an embodiment, slots 12 are not used and an adhesive coated on the interior of the body 10 is used to secure the timber. In an embodiment, magnetic components are used to secure dunnage other than timber.

The slots 12 also permit the timber 5 to be adjusted in a lengthwise direction. This permits the overall length of the timber 5 with the associated dunnage securement members 100 to modify the lengths to be, in an embodiment, between 90 inches and 120 inches from the end of one dunnage securement member 100 to end of another dunnage securement member 100. In an embodiment, the timber 5 and dunnage securement members 100 can be adjusted to a length of between 95 inches and 110 inches from the end of one dunnage securement member 100 to end of another dunnage securement member 100. In an embodiment, the timber 5 and dunnage securement members 100 can be adjusted to a length of between 75 inches and 125 inches from the end of one dunnage securement member 100 to end of another dunnage securement member 100. In an embodiment, the timber 5 and dunnage securement members 100 can be adjusted to a length of between 50 inches and 150 inches from the end of one dunnage securement member 100 to end of another dunnage securement member 100.

Formed on the body 10 are a rounded ridge 16, setback 17, rounded end 18 and pins 20. These portions of the dunnage securement member 100 are used to facilitate the securement of the timber 5 to the trailer and are discussed further below.

Figure 3:
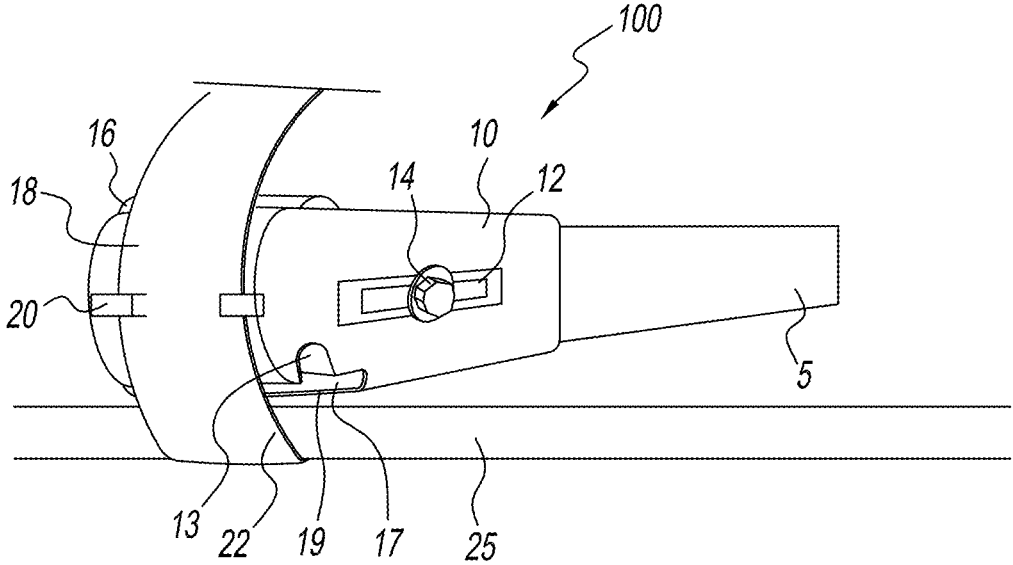
FIG. 3 shows a view of the dunnage securement member being secured with a strap.
Figure 4:
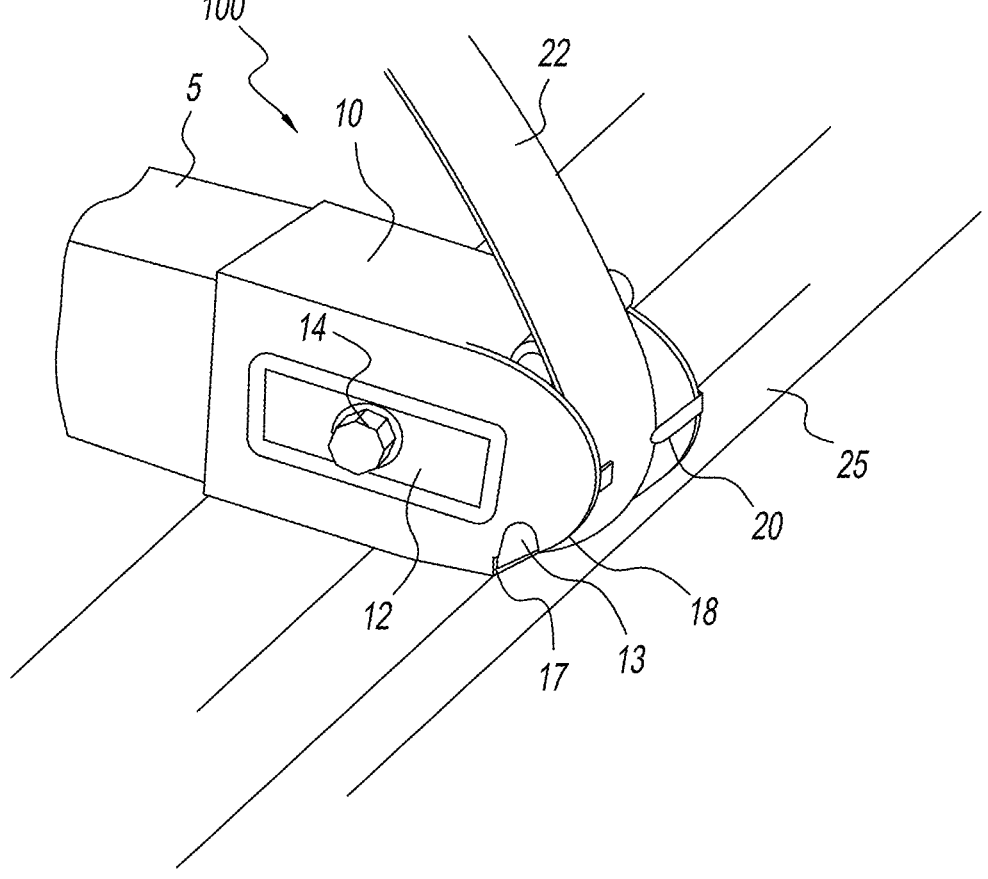
FIG. 4 shows another view of the dunnage securement member being secured with a strap.

Now referring to FIGS. 3 and 4 in particular, when the dunnage securement member 100 is attached to the ends of timbers 5, straps 22 (which in an embodiment are the 4-inch straps typically used in the industry) are manipulated and pinched by a user. The user then places the manipulated end of the strap 22 over the rounded ridge 16 and onto the rounded end 18 of the dunnage securement member 100.

Located within the rounded end 18 is a notch 13. The notch 13 is adapted to receive the rounded ridge 16 of another dunnage securement member 100. In an embodiment, the notch 13 is adapted to further be secured to the rounded ridge 16. However, generally, the notch 13 and the rounded ridge 16 cooperate so that the dunnage securement members 100 and the timbers 5 can be stacked on top of each other so that they are more steadily secured during transport.

It should be understood that while a rounded end 18 and notch 13 are shown, other shapes and configurations may be used, provided that the two portions generally capable of being secured to each. The rounded end 18 and the notch 13 are able to secure dunnage securement members 100 to each other while avoiding having too many angled portions that may fray straps 22 that are used.

The manipulated end of the strap 22 is released and the end of the strap 22 is secured by pins 20 and the setback 17 of the dunnage securement member 100. The setback 17 of the dunnage securement member 100 and the rounded end 18 help protect the strap 22. The pins 20 help to retain the strap 22 in one place. In the embodiment, shown in FIG. 4, the timber 5 is secured to a trailer bed 25.

Located proximate to the setback 17 is an opening 19. In an embodiment, the opening 19 is formed as a slot within an end portion of the dunnage securement member 100. In an embodiment, the opening 19 is one of a plurality of openings formed as slots in the end portion of the dunnage securement member 100. In an embodiment, the opening 19 is one of a plurality of openings formed as circular holes in the end portion of the dunnage securement member 100.

The opening 19 is located within the dunnage securement member 100 so that moisture that may be retained within pieces of timber 5 is able to evaporate from the timber 5. The ability of moisture to exit through the opening 19 makes it so the moisture is not retained within the dunnage securement member 100. Not retaining moisture within the dunnage securement member 100 prevents the timber 5 from rotting prematurely.

While two pins 20 are shown. In an embodiment, more than two pins 20 are used. In an embodiment, a series of pins 20 are used. In an embodiment, a latch is used. In an embodiment a clamp is used. In an embodiment, multiple pins 20 and latches are used.

The dunnage securement member 100 having rounded ends and/or edges prevents having portions of the strap 22 becoming frayed or cut in the tightening of straps 22 by ratchet (or other) force applied and the strap biting on a square edge or ruff timbers end surface. Other shapes for the end of the dunnage securement member 100 can also be used in order for the strap 22 to not be damaged. For example, a sloped surface or a polygonal shaped surface that prevents edges from being formed. Edged surfaces may potentially fray straps 22.

If there is a need to use more timbers in the middle and/or upper portion of a load, these timbers can be positioned to be utilized with the same strap or positioned elsewhere in the stacking of that load over another unused ratchet on the trailer to then use its own strap.

An advantage of the dunnage securement member 100 is that it provides a more symmetric and unified look to the loads. Additionally, the dunnage securement members 100 keep the timbers contained within straps to ensure that an end of the timbers do not move or walk out from between a strap or out from under a load and cause a potential damage or fatality during transport of materials or goods.

Another advantage of using the dunnage securement members 100 is that when timbers are not being used, they can easily be stacked one on top of the other and secured with the use of one strap. This provides an easier way of securing the timbers rather than using multiple chains and binders. A heap of timbers while not being used can becoming dislodged due to one poorly fit timber. This can cause slack in a chain binder or strap. The dunnage securement members ensure that unused timbers are safe to transport while in un used/storage mode.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed:

1. A dunnage securement member comprising:
   a body having a substantially rectangular shaped cavity adapted to receive a piece of timber;
   slots formed on at least two sides of the body, each of the slots adapted to receive a bolt for securing the piece of timber;
   a rounded end forming a portion of the body, the rounded end adapted to receive thereon a strap;
   at least two pins adapted to secure the strap to the rounded end; and
   a rounded ridge located on the body, wherein the rounded ridge is sized to be placed into another dunnage securement member; and
   wherein the rounded ridge is located adjacent the rounded end.

2. The dunnage securement member of claim 1, further comprising a setback located on the body.

3. The dunnage securement member of claim 2, further comprising an opening located proximate to the setback.

4. The dunnage securement member of claim 1, wherein the slots formed are rectangular shaped, the slots adapted to facilitate adjustment of the piece of timber piece of timber secured by the dunnage securement member.

5. The dunnage securement member of claim 1, wherein the dunnage securement member is adapted to be removably attached to the piece of timber.

6. The dunnage securement member of claim 1, further comprising a notch formed on the body.

7. The dunnage securement member of claim 6, wherein the notch is adapted to receive the rounded ridge of another dunnage securement member.

8. A dunnage securement member comprising:

a body having a cavity adapted to receive a piece of timber;

slots formed on the body, each of the slots adapted to enable securing the piece of timber;

an end adapted to receive thereon a strap;

a rounded ridge located adjacent the end;

at least two pins adapted to secure the strap to the end;

a notch formed on the body located on an opposite side of the body from the rounded ridge; and further comprising a setback located on the body proximate to the notch, wherein the notch is located between the end and the setback.

9. The dunnage securement member of claim 8, wherein the notch is adapted to receive the at least one other rounded ridge of another dunnage securement member.

10. The dunnage securement member of claim 8, further comprising an opening located proximate to the setback.

11. The dunnage securement member of claim 8, wherein the slots formed are rectangular shaped, the slots adapted to facilitate adjustment of the piece of timber piece of timber secured by the dunnage securement member.

12. The dunnage securement member of claim 8, wherein the dunnage securement member is adapted to be removably attached to the piece of timber.

13. The dunnage securement member of claim 8, wherein the cavity is rectangular shaped.

14. The dunnage securement member of claim 8, further comprising bolts placed through each of the slots.

15. The dunnage securement member of claim 8, wherein the end is rounded.

16. The dunnage securement member of claim 8, wherein the end is sloped.

17. The dunnage securement member of claim 8, wherein the slots are rectangular shaped.

18. The dunnage securement member of claim 8, wherein the slots are circular shaped.

\* \* \* \* \*